(No Model.)

N. P. BENSON.
Horseshoe.

No. 241,910.    Patented May 24, 1881.

*Fig. 2.*  *Fig. 3.*

*Fig. 4.*  *Fig. 5.*

Witnesses
A. H. Krause
H. G. Dieterich

Inventor
Nils P. Benson
by Louis Bagger & Co.
Attorneys

UNITED STATES PATENT OFFICE.

NILS P. BENSON, OF DENVER, COLORADO.

HORSESHOE.

SPECIFICATION forming part of Letters Patent No. 241,910, dated May 24, 1881.

Application filed February 7, 1881. (No model.)

*To all whom it may concern:*

Be it known that I, NILS P. BENSON, of Denver, in the county of Arapahoe and State of Colorado, have invented certain new and useful Improvements in Horseshoes; and I do hereby declare that the following is a full, clear, and exact description of the invention, which will enable others skilled in the art to which it appertains to make and use the same, reference being had to the accompanying drawings, which form a part of this specification, and in which—

Figure 1:
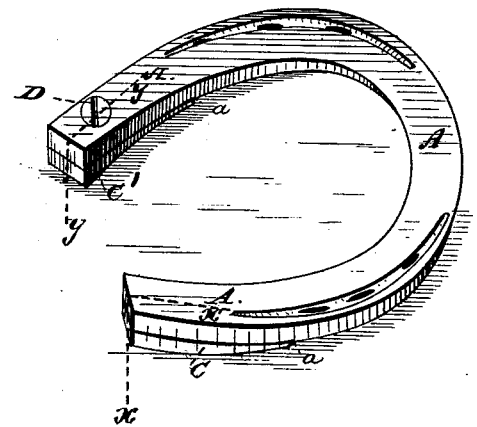
Figure 1:
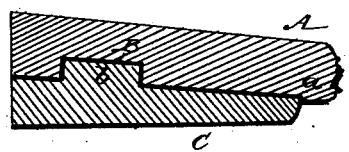
Figure 1:
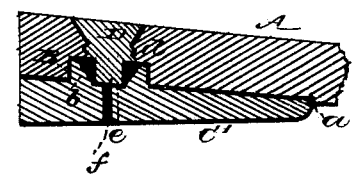
Figure 1:
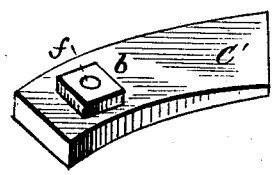
Figure 1:
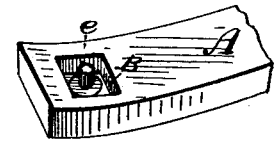

Figure 1 is a perspective view of a horseshoe embodying my improvement. Fig. 2 is a section through line $x\ x$. Fig. 3 is a similar section through line $y\ y$. Fig. 4 is a perspective (inverted) view of the elastic cushion shown in section in Fig. 3; and Fig. 5 is a perspective view of the corresponding end of the shoe.

Similar letters of reference indicate corresponding parts in all the figures.

My improvement contemplates the relief of horses suffering from corns in the hoof and the prevention of corns in sound hoofs; and to this end it consists in the combination, with the shoe, of peculiarly-constructed elastic pads or cushions, and means for applying liniment or other curative agents to the part of the hoof back of the cushion without the necessity of removing the shoe, as hereinafter described, and particularly pointed out in the claim.

In the annexed drawings, A represents the shoe, both ends of which are recessed, as shown at $a\ a$, with a deeper recess or square socket, B, in the upper face of and near each end of the shoe.

C C' represent the elastic pads or cushions, made preferably of india-rubber or gutta-percha, slightly curved to conform to the shape of the shoe, and tapering toward the front end, where it is cut off obliquely to conform to and fit into the recess $a$ in the shoe. The pads C C' are made with square offsets $b\ b$ on their under side, which fit into the sockets B, so as to prevent the pads from slipping after the shoe is nailed in place upon the hoof. Before this is done, however, the corn should be carefully cut as close as possible with a sharp knife, and covered with a thin pad of cotton-batting or cotton-batting and tow mixed saturated with liniment, turpentine, or some other healing and curative agent, and care should also be taken to pare the hoof smooth and even enough to cause the rubber pad to lie up close against the sore place, so as to prevent dirt or gravel from entering sidewise between the shoe and the hoof.

In order to provide means for applying the healing agent in a fluid form to the diseased place without having to remove the shoe, I construct the shoe with its pads as represented in Figs. 3, 4, and 5. The socket B in each end of the shoe is perforated, the lower (or outer) side of the perforation being countersunk to receive the head of a screw, D, which fits into the threaded perforation or aperture $d$. Screw D has a projection, $e$, and the offset $b$ on the under side of the elastic pad C' has a cup-shaped recess, which leads into a channel, $f$. When the pad is in its place upon the shoe and screw D inserted, its projection $e$ will fit over and thus close channel $f$; but by removing the screw, turpentine, liniment, or some other curative agent in a fluid form may be poured through the countersunk aperture $d$ and channel $f$, so as to soak the cotton covering of the diseased place, after which the screw is reinserted, to be again removed for a fresh application of liniment when occasion requires.

Having thus described my invention, I claim and desire to secure by Letters Patent of the United States—

In a horseshoe, the recessed and socketed ends $a$ B, having countersunk threaded aperture $d$, and screw D, having projection $e$, in combination with the elastic pads C, provided with the offsets $b$ and channels $f$, substantially as and for the purpose herein shown and set forth.

In testimony that I claim the foregoing as my own I have hereto affixed my signature in presence of two witnesses.

NILS PETER BENSON.

Witnesses:
FRANK C. MCARTHUR,
ISAAC N. STEVENS.